(12) United States Patent
Adams

(10) Patent No.: US 7,988,402 B2
(45) Date of Patent: Aug. 2, 2011

(54) TIRE-HANDLING DEVICE

(76) Inventor: Sky A. Adams, Augusta, GA (US)

( * ) Notice: Subject to any disclaimer, the term of this patent is extended or adjusted under 35 U.S.C. 154(b) by 67 days.

(21) Appl. No.: 12/450,278

(22) PCT Filed: Jan. 28, 2008

(86) PCT No.: PCT/US2008/001055
§ 371 (c)(1),
(2), (4) Date: Sep. 18, 2009

(87) PCT Pub. No.: WO2008/133761
PCT Pub. Date: Nov. 6, 2008

(65) Prior Publication Data
US 2010/0092270 A1   Apr. 15, 2010

(51) Int. Cl.
*B60B 30/00* (2006.01)
(52) U.S. Cl. .................. 414/426; 414/427; 414/430
(58) Field of Classification Search .......... 414/426, 414/427, 430
See application file for complete search history.

(56) References Cited

U.S. PATENT DOCUMENTS

| | | | |
|---|---|---|---|
| 1,964,119 A | 6/1934 | Hendry | |
| 2,692,694 A | 10/1954 | Goldstein | |
| 2,782,076 A * | 2/1957 | Miller | 305/20 |
| 2,919,659 A * | 1/1960 | Grimany | 105/215.1 |
| 3,482,719 A | 12/1969 | Sedgebeer | |
| 4,121,788 A * | 10/1978 | McMahon | 244/50 |
| 4,401,405 A | 8/1983 | Ealet | |
| 4,690,605 A | 9/1987 | Coccaro | |
| 5,007,789 A | 4/1991 | Painter | |
| 5,348,438 A * | 9/1994 | Roberts | 414/426 |
| 5,893,571 A | 4/1999 | Nowell | |
| 6,279,306 B1 * | 8/2001 | Langen | 57/281 |
| 6,382,644 B1 | 5/2002 | Rawlings | |
| 6,773,222 B1 * | 8/2004 | Gilchrist | 414/427 |
| 6,860,496 B2 * | 3/2005 | Novak et al. | 280/79.11 |
| 7,097,406 B1 | 8/2006 | Gang | |
| 2003/0021661 A1 | 1/2003 | Fluss | |
| 2005/0200091 A1 | 9/2005 | Mitchell et al. | |
| 2006/0151248 A1 | 7/2006 | Rodriguez et al. | |

FOREIGN PATENT DOCUMENTS

| | | | |
|---|---|---|---|
| GB | 2203707 | 10/1988 | |
| JP | 363144918 A * | 6/1988 | 414/426 |
| JP | 2000-309201 | 11/2000 | |
| JP | 2003-191704 | 7/2003 | |
| JP | 2006-21583 | 1/2006 | |
| KR | 1998-48785 | 9/1998 | |
| KR | 1998-0035841 | 8/1999 | |

* cited by examiner

Primary Examiner — Michael S Lowe
(74) Attorney, Agent, or Firm — Richard C. Litman

(57) ABSTRACT

The tire-handling device (10) is a compact, lightweight tool for carriage within a motor vehicle trunk or storage compartment to facilitate handling of a tire (T) during a tire change or similar operation. The device includes a tire support cradle (30) supported by opposed vertically adjustable handles (32). The handles (32) and cradle (30) therebetween may be adjusted to position the cradle (30) beneath a tire (T) on a raised axle during a tire change, or for aligning a fresh tire with the wheel mounting studs of the wheel hub. Two mutually opposed tire support belt rollers are disposed within the cradle (30). A tire support belt extends between the rollers, allowing a tire (T) resting thereon to be rotated for alignment with the mounting studs of the vehicle wheel hub.

6 Claims, 4 Drawing Sheets

TIRE-HANDLING DEVICE

TECHNICAL FIELD

The present invention relates generally to portable caddies, article holders and the like. More particularly, the present invention is a portable tire-handling device for holding and manipulating a vehicle tire while changing a flat tire or for other purposes.

BACKGROUND ART

Tires are likely the single most frequent repair or replacement item on a motor vehicle. The carriage of a spare tire is nearly universal in motor vehicles, with the exception being vehicles equipped with newer "run-flat" type tires. No other repair or replacement item or part is nearly so likely to be carried in a motor vehicle as a spare tire.

Motor vehicle tires have become considerably more reliable over the years, but total reliability is yet to be achieved. At the same time, motor vehicles have generally become heavier, with their wheels and tires becoming correspondingly larger and heavier as well. In past generations, the fifteen-inch wheel and a relatively narrow tire was the norm for full-size vehicles, but wheel and tire sizes have been increasing to ever larger diameters and widths, with corresponding weight increases, as the years have progressed.

In the past, it was considered routine to remove a flat tire and replace it with a spare tire carried in the vehicle. Even relatively small people could handle a standard tire, albeit with some degree of effort and exertion. With ever larger tires and wheels, many drivers (both male and female) find themselves unable to handle the weight and bulk of a tire from their vehicle when a roadside tire change is required, particularly in the case of larger sport-utility vehicles with wheels ranging perhaps up to nineteen inches in diameter. Yet, very little has been done in the past to aid the driver in this task.

Thus, a tire-handling device solving the aforementioned problems is desired.

DISCLOSURE OF INVENTION

The tire-handling device comprises a relatively compact and lightweight tool, which may be carried easily in the trunk or storage area of a motor vehicle to facilitate handling of a tire during the removal and replacement thereof when changing a flat tire or similar vehicle service. The tire handler includes a low, flat floor with four peripheral walls defining a tire support area therebetween. Two of the opposed walls include arcuate cutouts to provide clearance for a tire resting upon the device.

A vertically adjustable tire support cradle spans substantially all of the area of the underlying floor of the device. The tire support cradle is supported at opposite ends by a vertically adjustable handle. The handles may be locked in position to place the cradle at the desired height for positioning the device beneath a tire on a raised axle, or for positioning a spare or repaired tire at the proper height for securing to the wheel hub during a tire change. The cradle includes a pair of opposed tire support belt rollers and a belt extending therebetween. The belt enables a user of the device to rotate the tire as required to align the wheel mounting stud holes with their mounting studs, with the roller and belt assembly providing sufficient friction to hold the wheel and tire in position.

Various accessories may be provided for the tire-handling device, including a wheeled platform for greater versatility. The wheeled platform may include a vertically adjustable stop or brake to preclude unwanted motion of the assembly. A ramp may also be provided, the ramp being removably attachable to either handle to enable the user to transfer the tire between the device and the adjacent surface. The ramp may be removably attached to the remainder of the structure of the device. Lighting may also be provided along the upper periphery of the device for use at night or in conditions of poor light.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODES FOR CARRYING OUT THE INVENTION

The present invention is a relatively small and lightweight tire-handling device 10 suitable for carriage within the trunk or storage area of a motor vehicle, trailer, or the like to facilitate roadside changing of a tire or for other occasions when handling a tire may be necessary. The device 10 is configured for placement beneath an elevated tire on a motor vehicle V or the like to support and maneuver the tire during the removal thereof from the vehicle, and for the support and maneuvering of a spare tire (or repaired tire, etc.) back into position for installation on the vehicle.

Figure 1:
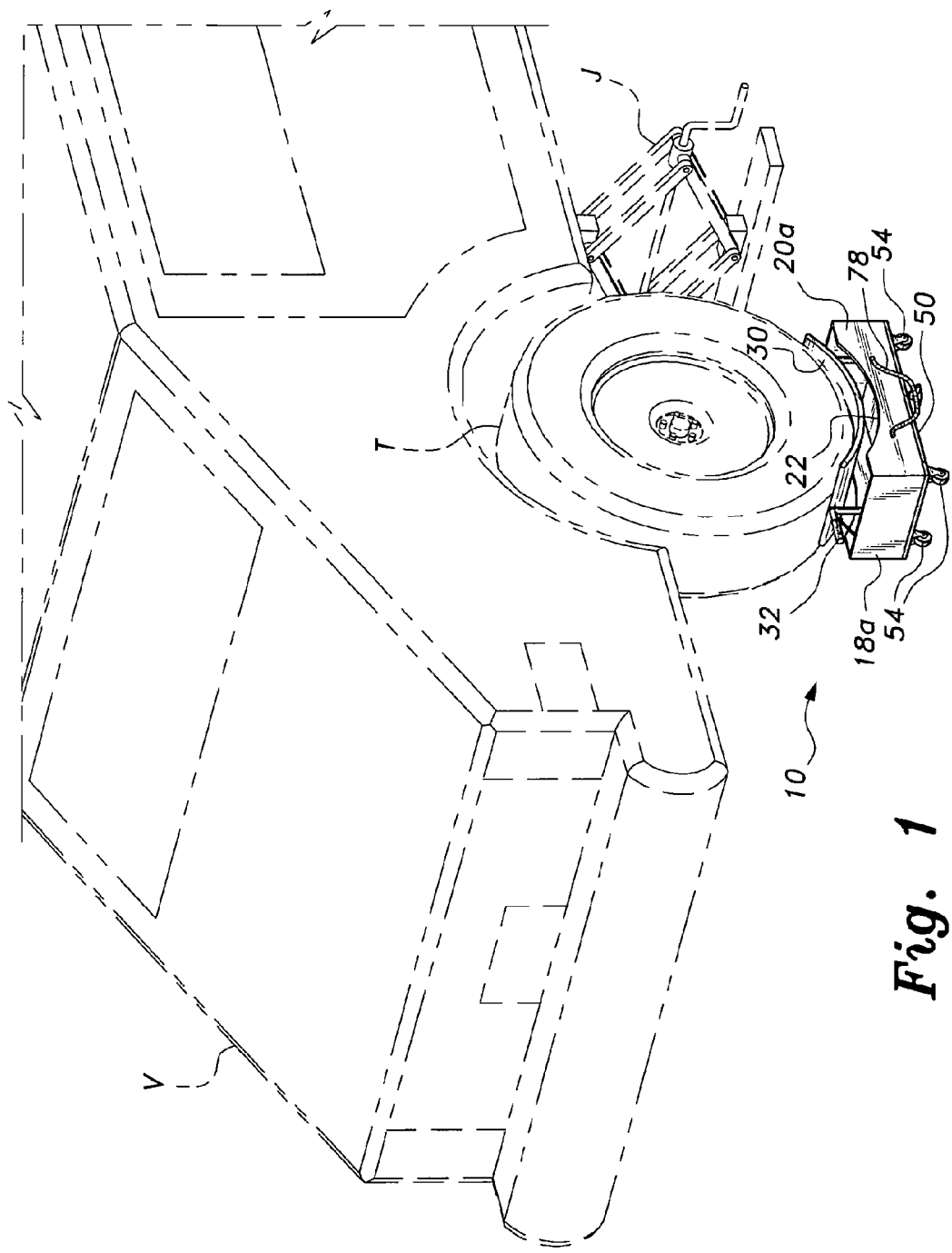
FIG. 1 is an environmental, perspective view of a tire-handling device according to the present invention, showing its operation and use.

FIG. 1 of the drawings provides an environmental perspective view of the tire-handling device 10 in use to support a wheel-and-tire assembly T as it is removed from, or installed upon, a vehicle V. The device 10 is not intended to support the weight of the vehicle V thereon, but only to facilitate the handling of the wheel-and-tire assembly T during removal and reinstallation thereof. Accordingly, the side of the vehicle V is elevated by a jack J to lift the tire T from the underlying surface to allow its removal from, and/or installation upon, the vehicle V.

Figure 2:
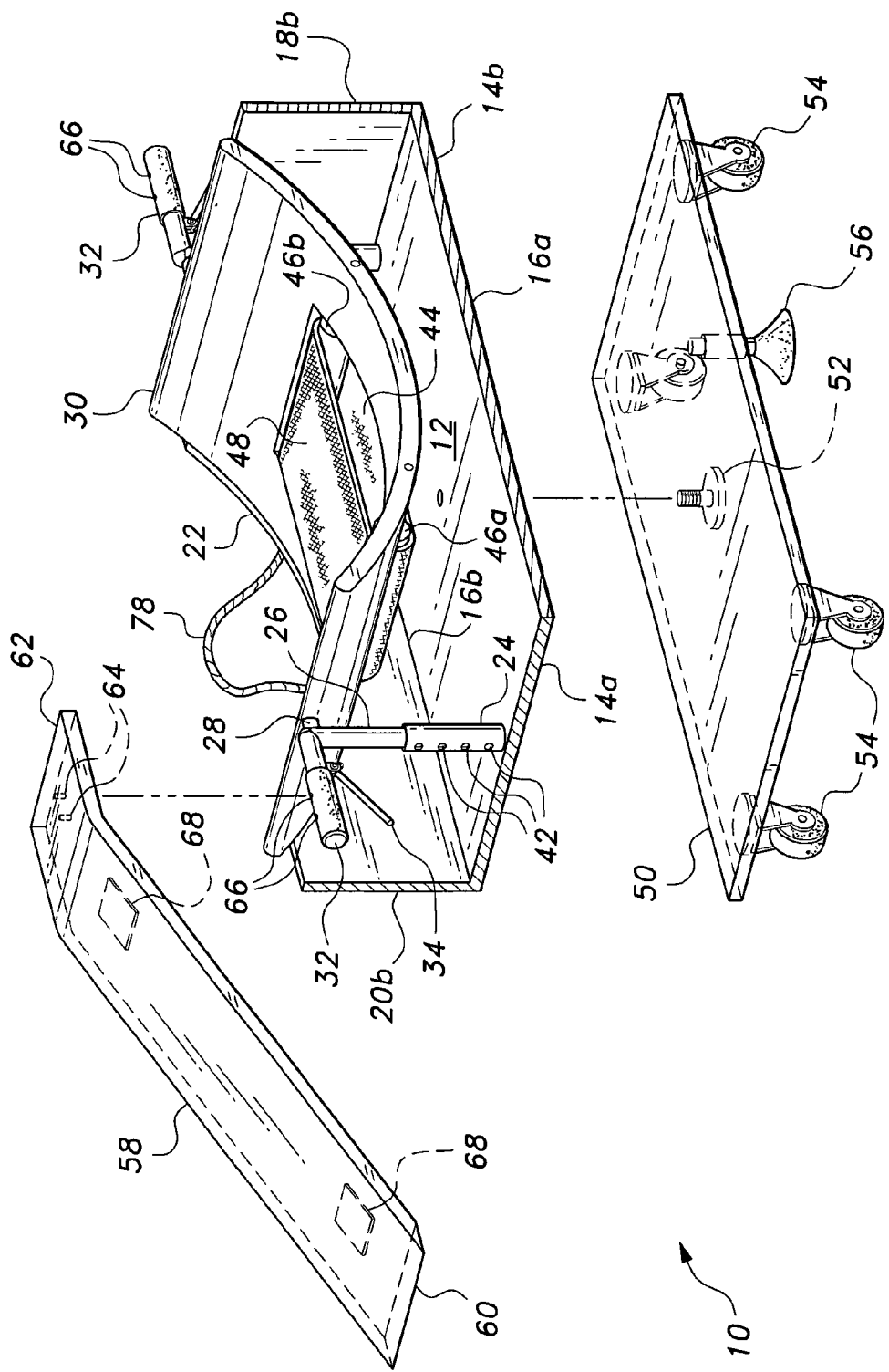
FIG. 2 is an exploded perspective view of the tire-handling device of the present invention, showing further details thereof.
Figure 3:
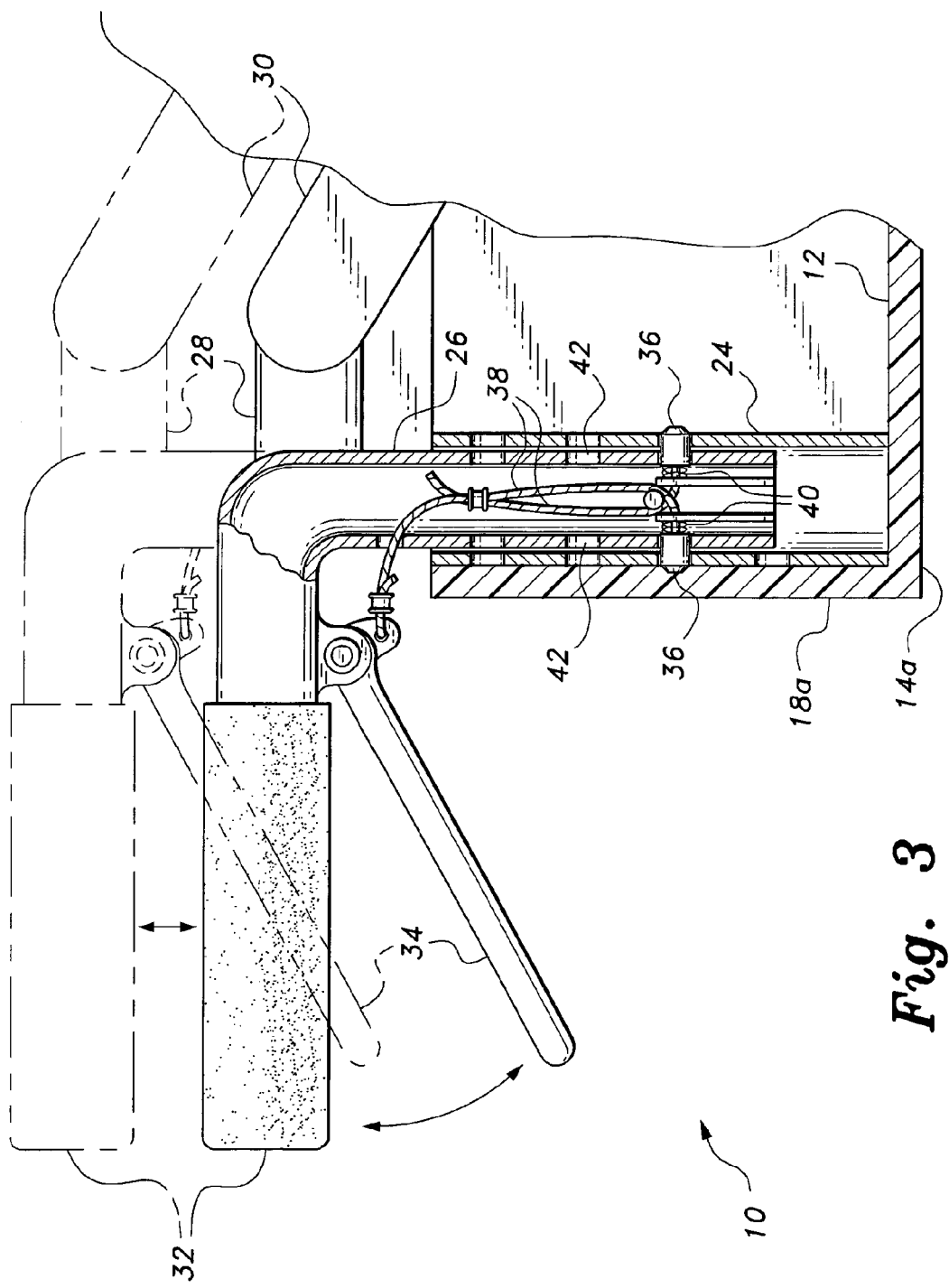
FIG. 3 is a detailed front elevation view in section of the tire-handling device of the present invention, showing the height adjustment mechanism for the tire support cradle and belt.
Figure 4:
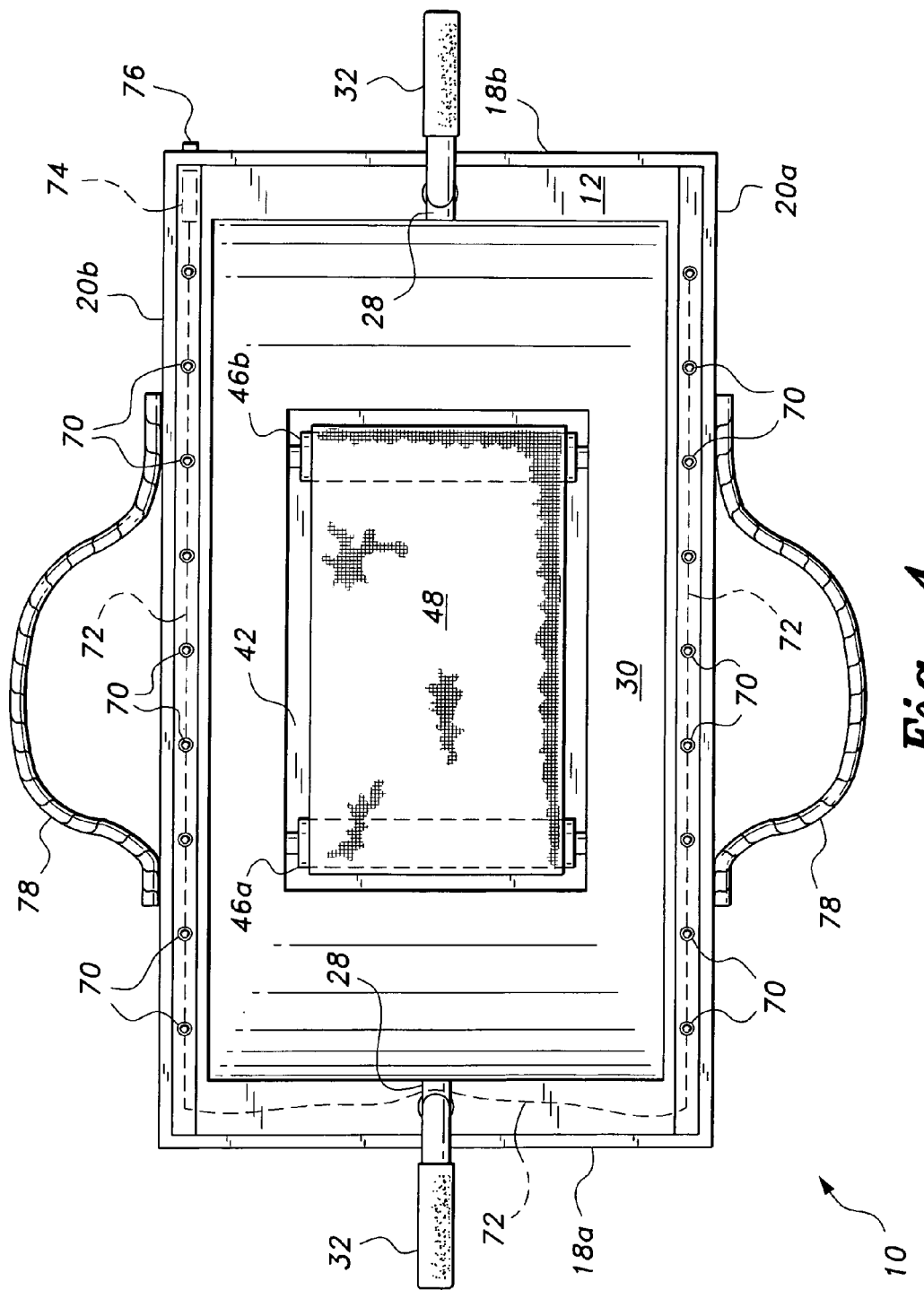
FIG. 4 is a top plan view of the tire-handling device of the present invention, showing further details thereof.

FIG. 2 of the drawing provides an exploded perspective view of the basic structure of the tire-handling device 10. The device 10 includes a relatively thin, flat floor 12 of rigid sheet material, the floor 12 having mutually opposed first and second ends, respectively 14a and 14b, and mutually opposed first and second sides, respectively 16a and 16b. First and second end walls 18a, 18b extend upwardly from the respective first and second ends 14a, 14b of the floor 12, and first and second sidewalls 20a, 20b extend upwardly from the respective first and second sides 16a, 16b of the floor 12. (The first end wall 18a is shown in FIGS. 1, 3, and 4, with the first sidewall 20a being shown in FIGS. 1 and 4.) Each of the two sidewalls 20a, 20b has an arcuate upper edge tire clearance relief 22 formed therealong, generally conforming to the curvature of the circumference of the tire T and tire support structure (described below) of the tire-handling device 10.

Mutually opposed first and second handle assemblies extend upwardly from the corresponding first and second ends 14a, 14b of the floor 12. These handle assemblies are vertically adjustable, and permit the vertical adjustment of the tire support structure to compensate for the elevation of a lifted tire during tire change operations or the like. FIG. 2 of the drawings provides a general view of the handle assembly of the first floor end 14a, with FIG. 3 providing a detailed view in section of the entire handle mechanism. It will be seen that the two handle assemblies are identical to one another, and accordingly identical reference characters are used for identical components.

Each of the handle assemblies includes a generally vertically disposed base tube 24 attached to and extending upwardly from the respective end 14a, 14b of the floor 12. A tire cradle attachment tube 26 telescopes concentrically within each of the base tubes 24, to extend from and retract into the respective base tube as desired. A tire support cradle attachment arm 28 extends inwardly, i.e., toward its opposite member, from the upper end of each tire cradle attachment tube 26, with the two arms 28 supporting a rigid, arcuate tire support cradle 30 therebetween. The tire support cradle 30 is generally curved to correspond to the rounded circumference of a tire T, which may be supported and carried thereon. A generally horizontally disposed handgrip 32 extends outwardly from the upper end of each tire cradle attachment tube 26, i.e., opposite the tire support cradle attachment arms. The handgrips 32 may include a padded grip cover thereon, if so desired.

Each handgrip 32 includes a latch release lever 34 pivotally extending from its base end. The lever 34 is connected to a pair of latch pins 36 by cables 38. The pins 36 are biased outwardly by springs 40 to engage holes or passages 42 formed through the walls of the base tube 24 and its tire cradle support or attachment tube 26. When it is desired to adjust the height of the tire support cradle 30, the latch release levers 34 of the two handle mechanisms are drawn toward their respective handgrips 32, thereby withdrawing the pins 36 from their passages 42 and allowing the tire cradle support tubes 26 to be adjusted upwardly or downwardly within their respective base tubes 24. The levers 34 are released when the cradle 30 has been positioned at about the height desired, with the pins 36 being urged into the holes or passages 42 through the two tubes 24 and 26 as the holes become aligned with one another during adjustment. This mechanism allows the height of the tire support cradle 30 to be adjusted closely to the height of the bottom of the tire T, to support the tire T as it is removed from the wheel hub. The tire support cradle 30 height may also be adjusted to vertically align a tire T placed thereon with the wheel hub for installation of the tire thereon, thereby obviating any need to physically lift the tire T into position.

Details of the tire support cradle 30 are shown in FIGS. 2 and 4. The cradle 30 includes a generally centrally disposed opening 44 therethrough, with first and second rollers, respectively 46a and 46b, extending transversely across the cradle opening 44 at the opposite ends thereof. A tire support belt 48 extends around the two rollers 46a and 46b, to cradle and support a tire T thereon. The rollers 46a, 46b permit the belt 48 to rotate therearound, thereby also allowing a tire T placed upon the belt 48 to be rotated to align the mounting holes of the wheel with the wheel mounting studs extending from the wheel hub of the vehicle V. The belt 48 is preferably relatively durable and somewhat stiff, thereby providing sufficient resistance to rotation to retain a tire T resting thereon at the desired position while still allowing the tire T to be rotated on the belt 48 without rolling the tire T off of the tire-handling device 10.

The tire-handling device 10 may be used as described above, i.e., with its floor 12 resting directly upon the underlying surface, or may alternatively be supported by wheels, either permanently attached to the floor 12, or, more preferably, with the wheels depending from a removable platform. FIG. 2 provides a detailed view of this embodiment, wherein a floor support platform 50 may be removably attached beneath the floor 12 by one or more attachment fittings 52 (e.g., hand-manipulated threaded fasteners, etc.). Wheels or casters 54 depend from the bottom of the support platform 50, with there preferably being one such wheel or caster 54 at each corner of the device. One or more of the casters 54 may include selectively controllable brake mechanisms, as is known in the art of small caster wheels, or the platform 50 may include a vertically adjustable braking foot 56 (e.g., a contact of rubber or other high friction material adjustable on a threaded shaft, etc.). This assembly of platform 50, attachment 52, wheels or casters 54, and brake 56 allows the tire-handling device 10 to be maneuvered easily, and also to be secured in a stationary position.

It will be recognized that it will be necessary to remove a tire T from its rest position atop the tire-handling device 10 and to reposition a tire T thereon during the use of the device. Accordingly, a ramp 58 may be provided to facilitate the placement or removal of a tire T upon or from the device, as shown in FIG. 2 of the drawings. The ramp 58 includes a first end 60 adapted to rest upon the underlying surface, and an opposite second end 62 including one or more handle attachment pins 64 depending therefrom. The handle attachment pins 64 engage corresponding ramp attachment receptacles 66 formed in the tops of the handgrips 32 to secure the ramp 58 in place. The ramp 58 may include some form of attachment means 68 thereon, e.g., mating hook and loop fabric material (e.g., Velcro®, etc.), mating tongue and groove assemblies, etc., to secure the ramp 58 removably to one of the walls of the device 10 for storage.

It is likely that there will be occasion to use the present tire-handling device 10 at night, or at least in conditions of low light. Accordingly, one embodiment may include lighting therein, as shown in FIG. 4 of the drawings. In FIG. 4, small, electrically-powered lights 70 (e.g., "superbright" light emitting diodes, etc.) are shown disposed along the tire relief clearance upper edge 22 of each of the sidewalls 20a and 20b. The lights 70 preferably share a common parallel circuit 72 (indicated by a single broken line in FIG. 4), with a replaceable and/or rechargeable battery 74 providing power, and with an on/off switch 76 (e.g., pushbutton, slide, toggle, etc.) controlling the circuit. Additional lighting may be provided as desired for warning purposes, greater illumination, etc. as desired. Alternatively, the lights 70 may be installed along the upper edge of only a single wall 20a or 20b, if so desired, for greater economy of manufacture.

In conclusion, the tire-handling device 10 in its various embodiments will prove to be a most appreciated accessory for many motorists. The device may be stored in the trunk or storage compartment of a car or other motor vehicle until needed, and removed and positioned as desired for the tire change operation. The device may include a pair of flexible carrying handles 78 to facilitate the carriage and positioning of the device. When the vehicle has been jacked up to elevate the tire above the underlying surface, the tire cradle 30 of the tire-handling device 10 is adjusted vertically to position the cradle 30 as closely as possible beneath the raised tire. This allows the tire to be unbolted from the wheel hub and to rest upon the tire support cradle 30 with minimal physical effort by the user of the device. The tire-handling device 10 with the defective tire resting thereon may be maneuvered as desired by means of the wheeled support platform and the defective tire and wheel assembly may be rolled from the handling device for storage as desired. The ramp provided with the tire-handling device will be of assistance in maneuvering the defective tire and wheel assembly into the trunk or storage compartment of the vehicle, if sufficient length is provided for the ramp.

Once the defective tire and wheel assembly have been removed, the inflated spare or replacement tire and wheel assembly may be installed. The procedure is essentially the reverse of that described above, i.e., height of the tire support cradle is adjusted as required, the new wheel and tire are rolled onto the device by means of the ramp, and the tire-handling device with its fresh tire and wheel assembly are rolled into position at the wheel hub. The tire and wheel assembly may be rotated upon the support cradle by means of the roller and belt assembly to align the mounting lug holes of the wheel with the mounting lugs of the wheel hub. The new tire and the wheel assembly are bolted in place, and the tire-handling device 10 is stored away for future use.

Accordingly, the tire-handling device 10 will prove to be a most desirable accessory for many motorists, particularly persons who may have less than ideal upper body strength for lifting and manipulating a wheel and tire assembly. Even stronger men will appreciate the value of the tire-handling device 10 when presented with the need to handle a larger wheel-and-tire assembly from a larger sport utility vehicle, light truck, or the like. Thus, many motorists will appreciate the presence of the tire-handling device 10 onboard their vehicles as they travel.

It is to be understood that the present invention is not limited to the embodiments described above, but encompasses any and all embodiments within the scope of the following claims.

The invention claimed is:

1. A tire-handling device, comprising:
  a floor having mutually opposed first and second ends and mutually opposed first and second sides, a first sidewall and a second sidewall extending upwardly from the first and second sides of the floor, respectively, each of the sidewalls having an upper edge having a tire clearance relief formed therein;
  first and second handles extending upward from the first and second ends of the floor, respectively, each of the handles having:
    a generally vertically-disposed base tube extending upwardly from the floor;
    a vertically adjustable tire cradle attachment tube telescopically extending from each of the base tubes;
    a generally horizontally disposed handgrip portion extending from each of the tire cradle attachment tubes;
    a latch release lever pivotally secured to each of the handgrip portions;
    a latch mechanism selectively locking each of the cradle attachment tubes in place within the corresponding base tube, the latch mechanism being selectively released by the corresponding latch release lever for adjusting the height of each of the cradle attachment tubes and an arcuately curved tire support cradle extending therebetween; and
  the arcuately curved tire support cradle extending between the tire cradle attachment tubes, the cradle having a generally central opening defined therein and the remaining portions of the cradle being imperforate, mutually opposed first and second rollers disposed transversely within the opening; and a tire support belt rotatably disposed about the first and second rollers, whereby the tire support belt defines the exposed surface through the opening.

2. The tire-handling device according to claim 1, further comprising:
  a floor support platform removably attached beneath the floor; and
  a plurality of wheels disposed beneath the support platform.

3. The tire-handling device according to claim 2, further comprising a vertically adjustable brake foot depending from the floor support platform.

4. The tire-handling device according to claim 1, further comprising:
  a ramp having a first end and a second end opposite the first end;
  at least one handle attachment pin depending from the second end of the ramp; and
  each of the handgrip portions having at least one ramp attachment receptacle therein for removably receiving the at least one handle attachment pin of the ramp.

5. The tire-handling device according to claim 1, further comprising:
  at least one electrically powered light disposed along the upper edge of at least one of the sidewalls.

6. The tire-handling device according to claim 1, further comprising: a carrying handle disposed on at least one of the sidewalls.

* * * * *